(12) United States Patent
Müller

(10) Patent No.: US 11,660,719 B2
(45) Date of Patent: May 30, 2023

(54) PARTING MACHINE, WORKPIECE POSITIONING DEVICE

(71) Applicant: ATM GmbH, Mammelzen (DE)

(72) Inventor: Heinrich Müller, Wölmersen (DE)

(73) Assignee: ATM GmbH, Mammelzen (DE)

( * ) Notice: Subject to any disclaimer, the term of this patent is extended or adjusted under 35 U.S.C. 154(b) by 1068 days.

(21) Appl. No.: 16/076,446

(22) PCT Filed: Feb. 9, 2017

(86) PCT No.: PCT/EP2017/052853
§ 371 (c)(1),
(2) Date: Aug. 8, 2018

(87) PCT Pub. No.: WO2017/137490
PCT Pub. Date: Aug. 17, 2017

(65) Prior Publication Data
US 2019/0039201 A1    Feb. 7, 2019

(30) Foreign Application Priority Data

Feb. 9, 2016    (DE) .................... 10 2016 102 218.7

(51) Int. Cl.
*B24B 27/06*    (2006.01)
*B24B 41/06*    (2012.01)
(Continued)

(52) U.S. Cl.
CPC ............. *B24B 27/06* (2013.01); *B23Q 1/623* (2013.01); *B23Q 1/625* (2013.01); *B24B 41/06* (2013.01);
(Continued)

(58) Field of Classification Search
CPC ......... B24B 49/00; B24B 49/183; B24B 5/02; B24B 5/042; B24B 27/0608;
(Continued)

(56) References Cited

U.S. PATENT DOCUMENTS 4,115,956 A * 9/1978 Huffman ................ B23Q 11/10
451/4
4,424,649 A    1/1984 Vincent et al.
(Continued)

FOREIGN PATENT DOCUMENTS

CN    201026534 Y    2/2008
CN    202399118 U    8/2012
(Continued)

OTHER PUBLICATIONS

Chinese Office Action w/Translation, Application No. 201780008727.6, Applicant: ATM GmbH, Title: Parting Machine, Workpiece Positioning Device, dated Sep. 20, 2019.
(Continued)

*Primary Examiner* — Joel D Crandall
*Assistant Examiner* — Makena S Markman
(74) *Attorney, Agent, or Firm* — Reising Ethington P.C.

(57) ABSTRACT

The present disclosure relates to a cutting machine comprising a rotating cutting wheel for performing separating cuts in a workpiece, and also relates to a workpiece positioning device for such a cutting machine. The cutting machine comprises a cutting wheel and a drive motor for driving the cutting wheel, a clamping means for clamping the workpiece, means for mechanically positioning the workpiece along one or two translational directions and additionally about one or two rotation axes, and a lifting mechanism for setting the cutting wheel on the workpiece to perform separating cuts in the positioned workpiece using the cutting wheel.

28 Claims, 14 Drawing Sheets

(51) Int. Cl.
*B23Q 1/62* (2006.01)
*B23D 45/02* (2006.01)
*B23Q 1/54* (2006.01)

(52) U.S. Cl.
CPC .......... *B23D 45/024* (2013.01); *B23D 45/028* (2013.01); *B23Q 1/5412* (2013.01)

(58) Field of Classification Search
CPC .............. B24B 27/0616; B24B 27/065; B24B 27/0658; B24B 27/0675; B24B 27/0683; B24B 27/0691; B24B 27/06; B24B 41/02; B24B 41/005; B24B 41/06; B28D 1/04; B28D 1/042; B28D 1/047; B23Q 1/623; B23Q 1/625; B23Q 1/5412; B23D 45/024; B23D 45/028
USPC .... 451/9, 10, 11, 12, 14, 17, 19, 24, 25, 26; 125/13.01
See application file for complete search history.

(56) References Cited

U.S. PATENT DOCUMENTS

| | | | | |
|---|---|---|---|---|
| 4,833,764 | A * | 5/1989 | Muller | B23Q 1/00 29/40 |
| 4,981,402 | A | 1/1991 | Krenzer et al. | |
| 4,989,372 | A * | 2/1991 | Avila | G01N 1/06 451/365 |
| 5,224,716 | A | 7/1993 | Saeda et al. | |
| 5,239,160 | A * | 8/1993 | Sakura | B23K 26/0884 219/121.82 |
| 5,377,454 | A | 1/1995 | Pedersen et al. | |
| 5,645,466 | A * | 7/1997 | Wikle | B23Q 1/5412 451/11 |
| 5,738,564 | A * | 4/1998 | Helle | B23Q 1/01 451/11 |
| 7,000,658 | B1 * | 2/2006 | Soukiassian | B27C 9/02 144/286.5 |
| 7,056,189 | B2 * | 6/2006 | Yui | B23Q 17/12 451/212 |
| 8,714,535 | B2 * | 5/2014 | Jung | B23Q 1/012 269/57 |
| 9,631,745 | B2 * | 4/2017 | Fujisawa | F16L 11/11 |
| 9,821,426 | B2 * | 11/2017 | Coleman | B23Q 1/5406 |
| 10,675,780 | B2 * | 6/2020 | Guazzoni | B28D 1/003 |
| 2002/0194967 | A1 * | 12/2002 | Prust | B23Q 7/047 82/120 |
| 2005/0271488 | A1 | 12/2005 | Liechti et al. | |
| 2010/0257711 | A1 * | 10/2010 | Ferguson | B24B 19/16 29/9 |
| 2010/0260569 | A1 * | 10/2010 | Ham | B23Q 1/5406 409/80 |
| 2011/0070807 | A1 * | 3/2011 | Sudo | B24B 27/06 451/450 |
| 2013/0273811 | A1 * | 10/2013 | Niemeyer | C21D 7/00 451/5 |

FOREIGN PATENT DOCUMENTS

| | | |
|---|---|---|
| CN | 204035685 U | 12/2014 |
| CN | 104916585 A | 9/2015 |
| CN | 108602171 A | 9/2018 |
| CN | 108602171 B | 6/2021 |
| DE | 3217705 A1 | 3/1983 |
| DE | 202016102268 U1 | 6/2016 |
| DE | 102016102218 A | 8/2017 |
| EP | 0743889 B1 | 1/1998 |
| EP | 0823310 A1 | 2/1998 |
| EP | 1201347 A2 | 5/2002 |
| EP | 2662186 A1 | 11/2013 |
| JP | S5834753 A | 3/1983 |
| JP | S59159529 | 9/1984 |
| JP | S6213158 U | 8/1987 |
| JP | S63182856 U | 11/1988 |
| JP | H05324322 A | 12/1993 |
| JP | H07506059 A | 7/1995 |
| JP | 2011088223 A | 5/2011 |
| JP | 2012125868 A | 7/2012 |
| JP | 2014172123 A | 9/2014 |
| JP | 2015170805 A | 9/2015 |
| WO | 2006012051 A2 | 2/2006 |
| WO | 2014128553 A1 | 8/2014 |
| WO | 2017137490 A1 | 8/2017 |

OTHER PUBLICATIONS

International Search Report, Int. Serial No. PCT/EP2017/052853, Filing Date: Feb. 9, 2017, Applicant: ATM GmbH, dated Jul. 10, 2017.
International Written Opinion, Int. Serial No. PCT/EP2017/052853, Int. Filing Date: Feb. 9, 2017, Applicant: ATM GmbH, dated Jul. 10, 2017.
German Office Action, Serial No. 10 2016 102 218.7, Applicant: ATM GmbH, dated Jan. 13, 2017.
Japanese Office Action w/English Translation, Japanese Patent Application No. 2018-543106, dated Aug. 9, 2019, Applicant: Yuzuru Okabe, et al.
Filed Submission of Competitor's Representative, Representative Name: Zacco Patent—& Rechtsanwalte, Dated Nov. 14, 2019.
Web page for MagerScientific, Metallographic Precision Cut Off Saw 8" Automatic Cut off Saw Brilliant 220 (BR220), Mager ATM Brilliant 220, Date: Jun. 2, 2013, https://www.youtube.com/watch?v=kXHtCCzQUrQ&feature=youtu.be.
Web page for MagerScientific, Metallographic Cut Off Saw 20" Brillant 275 (BR275) in Action, Mager ATM Brillant 275 Cut Off Saw, Date: May 28, 2015, https://www.youtube com/watch?v=GengiKP15vQ.
Web page for MagerScietifice, Metallographic Cut Off Saw 24" Automatic Precision Abrasive Cut Off Saw Brillant 285 (BR285), Date: Jul. 8, 2013, https://www youtube com/watch?v=lnskURGILeo &feature=youtu.be.
Wikipedia Article for Rotor, Bar Code: 15742434793839946914, Date: Nov. 11, 2019, 6 pages.
Chinese Office Action, Application No. 201780008727.6, Applicant: ATM GmbH, Title: Parting Machine, Workpiece Positioning Device, dated May 13, 2020.
Struers Catalog, Axitom-5 automatic cut-off machine, Year: 2012, 6 pgs.
Competitor Submission, Name: Struers ApS, Located in Ballerup, Danemark, Dated: Mar. 22, 2019.
Ref ZAC 13, Metallographic Cut Off Saw 24' Automatic Precision Abrasive Cut Off Saw Brillant 285, UTube Website, Date: Apr. 4, 2019.
Ref ZAC 14, Brillant 265, www.atm-m.com, Date: Apr. 4, 2019.
Ref ZAC 14a, Brillant 285,www.atm-m.com, Date: Apr. 4, 2019.
Ref ZAC 15, Brillant 2000, Industry Wet Abrasive Cut-off Machine, www.atm-m.com, Date: Apr. 4, 2019.
Ref ZAC 16, Brillant 220 Trennmaschine, ATM Newsletter, www.atm-m.com, Date: Apr. 4, 2019.
Ref ZAC 17, Rotavice, ATM Newsletter, www.atm-m.com. Date: Apr. 4, 2019.
Ref ZAC 18, Drehvorrichtung, www.atm-m.com, Date: Apr. 4, 2019.
Ref ZAC 19, Drehvorrichtung, www.atm-m.com, Date: Apr. 4, 2019.
Ref ZAC 19A, Special Clamping Device for Clutch Case, www.atm-m.com, Apr. 4, 2019.
Ref ZAC 20, ATM Cutting Accessories, www.atm-m.com, Date: Apr. 4, 2019.
Ref ZAC 24, Axitom-5, Fully automatic cut-off machine, designed for maximum user-friendliness, www.atm-m.com.
Ref ZAC 25, Rotary Table, Wikipedia Definition: https://en.wikipedia.org/w/index.php?title=Rotary, Date: Apr. 4, 2019.
Iternet entry of archive.org, http://struers.com/deDE/Products/Cutting/Cutting-equipment/, Date: Apr. 17, 2019 ref: NPL1-BZ5.

(56) References Cited

OTHER PUBLICATIONS

Internet entry of archive.org, http://struers.com/deDE/Products/Cutting/Cutting-equipment/Magnutom, Date: Nov. 4, 2017, ref: NPL2-BZ6.
BT printed matter 10/3903, pp. 1 and 20, Date: Sep. 26, 1985, ref: NPL3-D27.
Printout of on line Dictionary LEO scribers,Date: Sep. 11, 2020, ref: NPL4-D28.
Example of Diamond Scribers, www.atv-tech.de, ref: NPL5-D29.
Communication Under Rule 71(3) EPC with text intended for grant, Registration No. EP17704453.4, Applicant: ATM Qness GmbH, Date: Feb. 16, 2022, ref: NPL6-D30.
Brief filed by Blumbach with the EPO with annexes, Registration No. EP17704453.4, Date: Mar. 26, 2019, ref: NPL7-D31.
Brief filed by Blumbach with the EPO with annexes, Registration No. EP17704453.4, Date: Aug. 14, 2020, ref: NPL8-D32.
Blumbach authorization request, dated Dec. 18, 2018, ref: NPL9-ZAC2.
Response letter from ZACCO to Blumbach authorization request, Date: Jan. 28, 2019, ref: NPL10-ZAC3.
Blumbach letter in defense of the validity of the Utility Model, Date: Feb. 18, 2019, ref: NPL11-ZAC4.
Classification of Characteristics for the Protection Claim, Date: Apr. 4, 2019, ref: NPL12-ZAC5.
Register Excerpt for File No. 1020161022187, Date: Apr. 2, 2018, ref: NPL13-ZAC6.
Classification of features for claim 1 of the Main Request, ref: NPL14-BZ1.
Color printout of Rotating Device from ATM GmbH homepage (www.atm-m.com), ref: NPL15-BZ2.
Excerpt Struers website, Magnutom 5000 XYZR, www.struers.com/deDE/Products/Cutting/Cuttingequipment/Magnutom#t, ref: NPL16-BZ3.
Data Sheet for the Brillant 255, ATM Qness GmbH, Date Jan. 17, 2020, ref: NPL17-BZ4.
Classification of features for claim 1 in accordance with the main application, Date: Jan. 21, 2020, ref: NPL18-BZ1A.
Substitute Receipt Digital Medium, listing folder paths for volume Brillant 285, vol. 00000002 E5E2 : F481, Date of Receipt: Apr. 4, 2019, ref: NPL19-ZAC12A.
Request filed by Struers for cancellation of the utility model, No. DE 20 2016 102 268, Owner: ATM GmbH, Date Mar. 22, 2019, ref: NPL20-NPL1.
Reply filed by Blumbach regarding the request for cancellation, No. 20 2016 102 268.1, Owner: ATM GmbH, Date: Jul. 31, 2019, ref: NPL21-NPL2.
Reply of the opponent representative, No. DE 20 2016 102 268.1, Owner: ATM GmbH, Date: Nov. 14, 2019, ref: NPL22-NPL 3.
Submission filed by Blumbach, No. 20 2016 102 268.1, Owner: ATM GmbH, Date: Jan. 24, 2020, ref: NPL23-NPL4.
Preliminary Opinion of the German Patent and Trademark Office GPTO, No. 20 2016 102 268.1, Owner: ATM GmbH, Date: Aug. 21, 2020, ref: NPL24-NPL5.
Submission filed by Blumbach regarding the preliminary decision of the GPTO, No. 20 2016 102 268.1, Owner: ATM GmbH, Date: Nov. 11, 2020, ref: NPL25-NPL6.
Reply to the opponent representative, No. DE 20 2016 102 268.1, Owner: ATM GmbH, Date: Nov. 12, 2020, ref: NPL26-NPL7.
Submission filed by Blumbach, No. 20 2016 102 268.1, Owner: ATM Qness GmbH, Date: Apr. 25, 2022, ref: NPL27-NPL8.
Submission of the opponent representative, No. DE 20 2016 102 268.1, Owner: ATM GmbH, Date: Apr. 11, 2022, ref: NPL28-NPL9.
Submission filed by Blumbach, No. 20 2016 102 268.1, Owner: ATM Qness GmbH, Date: May 9, 2022 , ref: NPL29-NPL10.
CD with Promotional Video for cutoff machine ATM Brillant 285 screen-shot, Date: Jun. 1, 2022, ref: NPL30-ZAC27C.
CD with Promotional Video for cutoff machine ATM Brillant 275 screen-shot, Date: Jun. 1, 2022, ref: NPL31-ZAC27B.
CD with Promotional Video for cutoff machine ATM Brillant 220 screen-shot, Date: Jun. 1, 2022, ref: NPL32-ZAC27A.
Brillant 285 screen-shot, DVD Movie, Video playback, Date: Jun. 1, 2022, ref: NPL33-ZAC12.
Current screen-shot for Brillant 285, youtube.com, Date: May 9, 2022, ref: NPL34-D35.
Screen-shot for Brillant 220, youtube.com, Date: May 9, 2020, ref: NPL35-D36.
Screen-Shot of Brillant 220, ref: NPL36-ZAC27D.
Receipt for Utility Model Cancellation, 20 2016 102 268.1, Owner: ATM GmbH, Date; Nov. 11, 2019, Ref: NPL37-ZAC27E.
Cancellation Request against Utility Model No. 20 2016 102 268.1 Struers ApS./.ATM GmbH, Submitted to the German Patent and Trademark Office, Attorney: Dr. Nils Köster, Date: Jul. 29, 2022, Ref:2022072919264900DE.
ZAC31, Wikipedia, Maschinenbauingerieur, Date; Jul. 29, 2022, 3 pgs.
ZAC32, Wikipedia, Numerical Control, Date: Jul. 29, 2022, 10 pgs.
ZAC33, Brochure for the System MFP 50, Mägerle AG Maschinenfabrik.
ZAC34a, Magerle MFP50 Vane Grinding, You Tube Video: https://www.youtube.com/watch?v=KIYfSBZ1ywk, Oct. 28, 2022.
ZAC34b, Creep Feed Grinding, You Tube Video: https://www.youtube.com/watch?v=SfVv2KNzfmo, Oct. 28, 2022.
ZAC35, Screen shots of You Tube Videos for: Magerie MFP50 Vane Grinding https://www.youtube.com/watch?v=KIYfSBZ1ywk and Creep Feed Grinding https://www.youtube.com/watch?v=SfVv2KNzfmo.

\* cited by examiner

PARTING MACHINE, WORKPIECE POSITIONING DEVICE

TECHNICAL FIELD

The present disclosure relates to a cutting machine comprising a rotating cutting wheel for making separating cuts in a workpiece, and also relates to a workpiece positioning device for such a cutting machine.

BACKGROUND

Cutting machines such as wet abrasion cutting machines are used for a variety of separation tasks. Examples of such cutting machines are the devices of the Brillant series, such as Applicant's Brillant 275 cut-off machine to which reference is hereby made.

An application field for such cutting machines is the separation of sample portions from test specimens to be examined, for example, in the automotive industry. This allows, for example, to selectively examine microstructures at different points of a test specimen. For this purpose, sample portions are cut out of the test specimen using the cutting machine. The wet cutting process allows for removal of sample portions in such a way that microstructural damage caused by the separating cut is kept low at the later test surface.

In many cases, one or two separating cuts are sufficient to detach a sample portion from the test specimen. For these cases, standardized clamping tools are used to fix the test specimen in the cutting machine and then to set and perform the separating cut. However, with the ever increasing requirements on components, for example, in the automotive industry in terms of their compact design, their weight, their material properties, their manufacturing process, etc., and at the same time increasing requirements on quality and reliability of the components, the test specifications are becoming more complex and more extensive. As a result, separating tasks may arise, for example, in which, depending on the component, a plurality of sample portions, e.g. 5 to 10, are to be taken from a test specimen, which accordingly requires a corresponding number of separating cuts in different angular positions.

A drawback of the prior art cutting machines is that such complex separation tasks may require manual user intervention; in particular, it may be necessary to possibly even repeatedly re-clamp the test specimen or workpiece, which is cumbersome and time-consuming. This is the starting point of the present disclosure.

GENERAL DESCRIPTION

The object of the present disclosure is therefore to provide a cutting machine which performs complex separation tasks with little manual effort from the user.

A further object of the present disclosure is to provide a cutting machine which quickly and easily makes separating cuts in different angular positions.

Yet another object of the present disclosure is to allow for retrofitting of existing cutting machines with improved functionality.

The object of the present disclosure is achieved by the subject-matter of the independent claims. Multiple possible embodiments of the invention are specified in the dependent claims.

According to the present disclosure, a cutting machine is provided for processing workpieces, the cutting machine comprising a cutting wheel for making separating cuts in a workpiece such as a test specimen, and a drive motor for driving the cutting wheel.

The cutting machine comprises a work table for fixing the workpiece to be processed, the work table defining an xz-plane, e.g. the horizontal plane.

A first displacement means can be used to effect a relative displacement between the workpiece and the cutting wheel in a first direction in the xz-plane in order to position the workpiece in the first direction in the xz-plane relative to the cutting wheel, for separating cuts using the cutting wheel. Depending on the cutting machine, the displacement may be accomplished by a translational displacement of the work table or by a translational displacement of the cutting wheel.

The cutting machine may further comprises a workpiece positioning device including a clamping means for clamping the workpiece. The workpiece positioning device may further comprise a first mechanical rotating means for rotating and rotatably positioning the workpiece clamped in the clamping device about a first rotation axis D, prior to or between making separating cuts.

After translationally and rotatably positioning the workpiece relative to the cutting wheel, the cutting wheel is set on the workpiece in the y-direction perpendicular to the xz-plane, by a lifting mechanism, in order to make separating cuts in the workpiece using the cutting wheel. A separating cut in the workpiece is performed by introducing the rotating cutting wheel into the workpiece, in particular, in an advancement direction perpendicular to the rotation axis of the cutting wheel, while an abrasive cutting operation is carried out on the workpiece. A separating cut with a cutting wheel is, in particular, made through grinding or abrasive removal of the material of the workpiece. Therefore, cutting machines are sometimes also referred to as abrasion cutting machines. The cutting wheel may be lowered onto the workpiece, e.g. by a pivoting movement. However, it is also possible to reverse the kinematics and to move the work table towards the cutting wheel, perpendicularly to the xz-plane, in order to bring the cutting wheel in contact with the workpiece. Preferably, the rotating cutting wheel is moved in the plane perpendicular to the rotation axis of the cutting wheel during approaching and cutting. Preferably, the cutting wheel is not rotatable about an axis perpendicular to the rotation axis of the cutting wheel. Furthermore preferably, the setting of the cutting wheel and the separating cuts are performed, in particular exclusively, through movement of the lifting mechanism in the y-direction, while the work table is otherwise hold stationary in the xz-plane.

Thus, the workpiece can not only be translated relative to the cutting wheel, but can also be rotated to be positioned for performing separating cuts, which allows to execute complex separation tasks with separating cuts at different angles. The setting for different cuts may be effected automatically and optionally without re-clamping the workpiece. Further, the efforts for complex workpiece removal instructions can be reduced or avoided. This can save time and reduce manual intervention. Furthermore, the number of clamping tools can be reduced while it is nevertheless possible to make precisely positioned separating cuts. Furthermore, the risk of failure can be minimized.

Preferably, the workpiece positioning device furthermore comprises a second mechanical rotating means for rotatably positioning the workpiece clamped in the clamping device about a second rotation axis E before or between making separating cuts. The second rotation axis preferably lies transversely, in particular perpendicular to the first rotation axis D.

This permits to further increase the flexibility of positioning and the degree of automation, to further reduce the processing time, and to further reduce the number of manual interventions as well as the number of clamping tools.

Preferably, the first rotation axis D is perpendicular to the xz-plane of the work table, and/or the second rotation axis E is parallel to the xz-plane of the work table.

Preferably, the first and/or second mechanical rotating means allow to rotate the workpiece by at least 90°, most preferably by at least 180° about the first and second rotation axes, respectively. It has been found that the possibility to be rotated by 180° plus 10° overrotation in both directions is sufficient for most separation tasks.

Preferably, the cutting machine comprises a second displacement means for producing a relative displacement between the workpiece and the cutting wheel in a second direction in the xz-plane transversely, in particular perpendicular to the first direction, in order to be able to position the workpiece for separating cuts with the cutting wheel in the first and second directions, i.e. in both directions in the xz-plane, relative to the cutting wheel. For this purpose, the work table may for instance comprise a two-dimensional xz translation mechanism, or the work table is configured to be displaceable in one direction, x or z, and the cutting wheel can be displaced in the second direction perpendicularly thereto, in order to accomplish the two-dimensional translational relative positioning in the xz-plane between the cutting wheel and the workpiece.

In particular if two-dimensional displaceability in the xz-plane and rotatability about both axes D and E is provided, the workpiece can be automatically positioned in almost any translational position and rotational position relative to the cutting wheel, so that almost any desired separating cut can be performed without any user intervention and without re-clamping the workpiece. This is associated with savings in manual working time and processing time. In this case, we can speak of a 5-axes cutting machine, two axes being defined by the translation in the xz-plane, two axes being defined by the two rotational axes D and E, and the fifth axis by the setting direction y.

Preferably, the setting of the cutting wheel or making of the separating cuts is achieved by a movement of the lifting mechanism in y-direction, whereas the workpiece is not rotated about the first and/or second rotational axes while making the separating cuts. In other words, the positioning of the workpiece in x-direction, in y-direction, about the first rotation axis, and/or about the second rotation axis relative to the cutting wheel is preferably only carried out for positioning the workpiece before making the separating cut and not while making the separating cut. The separating cut is preferably carried out exclusively by actuating the lifting mechanism for advancing the rotating cutting wheel towards and into the workpiece.

According to a preferred embodiment of the present disclosure, the workpiece positioning device is releasably clampable on the work table, e.g. in the clamping or mounting grooves typically provided in the work table. This has the advantage that already existing cutting machines can be retrofitted with the workpiece positioning device, and that the workpiece positioning device can be removed, for example for maintenance or cleaning work. Furthermore, the workpiece positioning device may for example even be fixed at different locations in the clamping or mounting grooves. Nevertheless, the workpiece can be clamped to the workpiece positioning device in stable manner and with low vibration.

The workpiece in particular protrudes out of the plane defined by the work table, and thus is located in a space between the work table and the cutting wheel in its clamped state, before the cutting wheel is set on the workpiece.

The workpiece positioning device preferably comprises a respective stepping motor and a worm drive driven by the stepping motor, for rotatably positioning the workpiece clamped in the clamping device about the first and/or second rotation axes. Preferably, the first and/or second mechanical rotating means are thus configured to be self-locking. This permits to ensure that the workpiece is supported stably.

According to a preferred embodiment of the present disclosure, the workpiece positioning device comprises a fixing plate and a rotary housing. The fixing plate of the workpiece positioning device is releasably clamped to the work table, e.g. by means of clamping screws in the clamping or mounting grooves of the work table. The rotary housing is mounted for rotation about the fixing plate, and for rotatably positioning the workpiece about the first rotation axis D, the rotary housing is rotated about the fixing plate, in particular together with the first and/or second stepping motors for the first and second mechanical rotating means. In other words, for rotation about the first rotation axis D, almost the entire workpiece positioning device is rotated, except for the clamped fixing plate. This allows for a stable construction and precise rotation of the workpiece positioning device.

Preferably, the workpiece positioning device has electrical supply lines which are routed so as to be flexible about the y-direction perpendicular to the xz-plane, e.g. with a flexible cable chain, sometimes also referred to as energy chain.

Preferably, the workpiece positioning device comprises a quick-change device in which the clamping means can be latched so that different clamping means can be fixed to the workpiece positioning device and can also be exchanged quickly and easily.

The cutting machine furthermore preferably comprises a machine housing which accommodates the cutting wheel, the work table, the workpiece positioning device, and/or the flexibly routed supply lines, and which defines a closable working space. For this purpose, the machine housing comprises a covering hood which closes the working space while the separating cuts are made, but allows the user to access the workpiece positioning device and the workpiece prior to and after the making of the separating cuts. The cutting machine thus meets high safety requirements and allows for working with high coolant pressure, so that adequate cooling of the cutting wheel and the workpiece is guaranteed.

The separation machine preferably comprises a program controller for automatically controlling the separating cuts. Preferably, the control of the workpiece positioning device and the control of the first and/or second rotating means is integrated into the existing program controller of the cutting machine, so that the program controller automatically controls the relative displacement in the first and/or second directions and the rotation of the workpiece about the first and/or second rotational axes prior to and between separating cuts, so that the program controller can automatically control a plurality of separating cuts in succession, at different positions in the xz-plane and with different rotational positions of the workpiece.

Furthermore preferably, the cutting machine has a control panel with one or more manual control knobs, e.g. rotary knobs and/or so-called joysticks for manually driving the first and/or second displacement means and the first and/or second mechanical rotating means so as to be able to manually set desired separating cuts.

For programming the desired separating cuts, it is in particular possible to manually set the starting position in the first and/or second directions in the xz-plane and with respect to the first and/or second rotational position of the workpiece using the one or more manual control knob(s), and to store it in the program controller. The associated separation path and optionally further separation parameters such as advance rate and/or intermittent advancement may be programmed into the program controller as numerical values or check boxes, for example, via the control panel.

Preferably, the cutting machine furthermore comprises a diameter measuring device for the cutting wheel, which automatically measures the diameter of the cutting wheel, for example prior to each separating cut during a separation task including a plurality of separating cuts, or on user request between the separating cuts. The program controller can then automatically and online adjust the previously stored setting and separating paths for the separating cuts still to be performed after a respective measurement, on the basis of the measured diameter values, in order to compensate for the ongoing wear of the cutting wheel even during a separation task that comprises a plurality of individual separating cuts.

Also a subject-matter of the present disclosure is the workpiece positioning device for being fixed to a work table of a cutting machine, for example as a retrofit part for existing cutting machines. The workpiece positioning device accordingly comprises a fixing means for rigidly clamping the workpiece positioning device to the work table of the cutting machine, a clamping means for clamping a workpiece, and a first mechanical rotating means for rotatably positioning the workpiece clamped in the clamping means about a first rotation axis D, and/or a second mechanical rotating means for rotatably positioning the workpiece clamped in the clamping device about a second rotation axis E prior to or between performing separating cuts, in order to make the separating cuts in different rotational positions without manually re-clamping the workpiece.

The present disclosure accordingly provides a cutting machine for processing workpieces using a rotating cutting wheel, which comprises a cutting wheel and a drive motor for driving the cutting wheel, a clamping means for clamping the workpiece, means for mechanically positioning the workpiece along one or two translational directions and additionally about one or two rotation axes, and a lifting mechanism for setting the cutting wheel on the workpiece to perform separating cuts in the positioned workpiece using the cutting wheel.

The present disclosure will now be explained in more detail by way of multiple possible embodiments and with reference to the figures, in which the same and similar elements are partially designated with the same reference numerals. Features of multiple possible embodiments can be combined.

BRIEF DESCRIPTION OF THE FIGS

DETAILED DESCRIPTION

Figure 1:
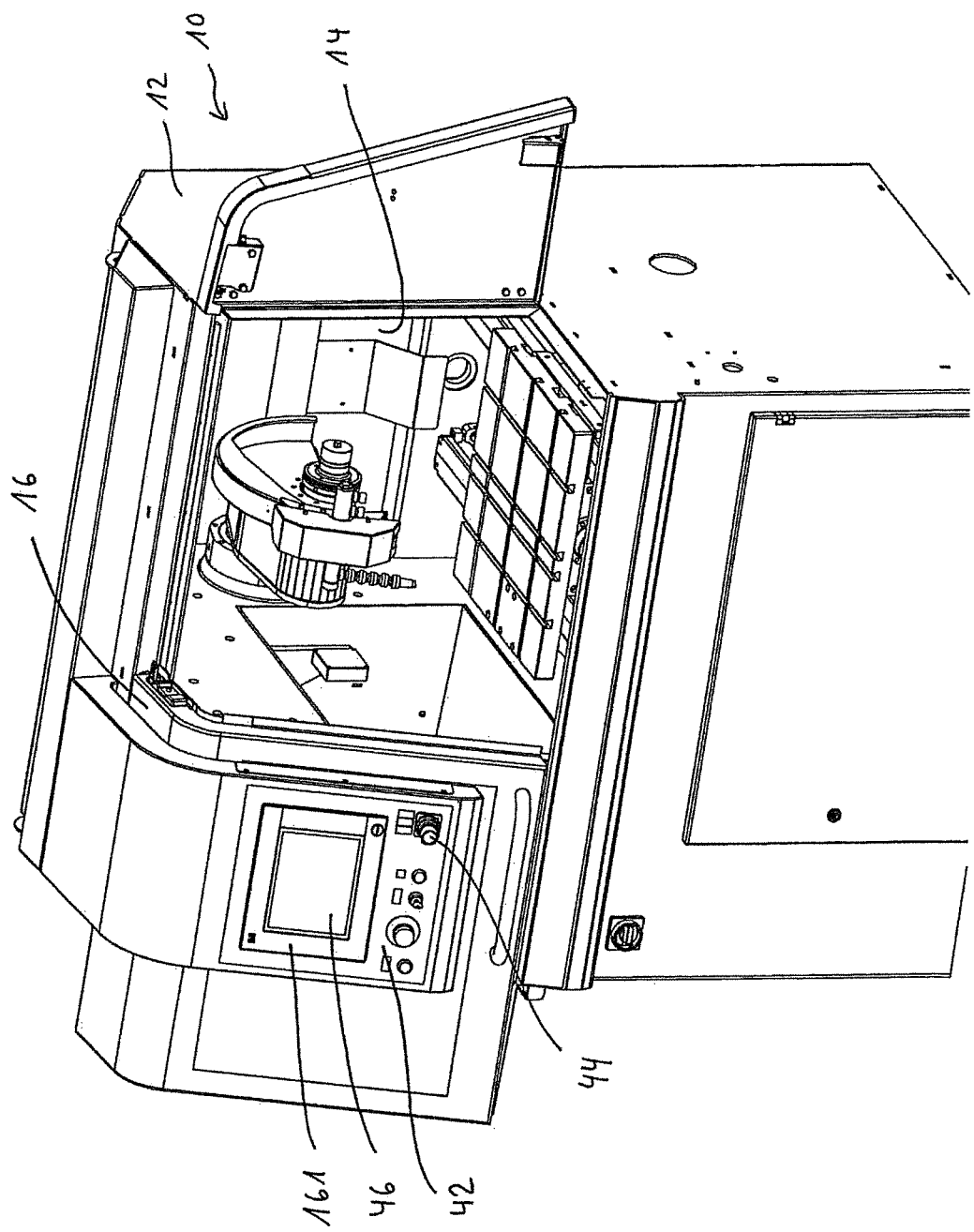
FIG. 1 is a perspective view of Applicant's cut-off machine Brillant 275.
Figure 2:
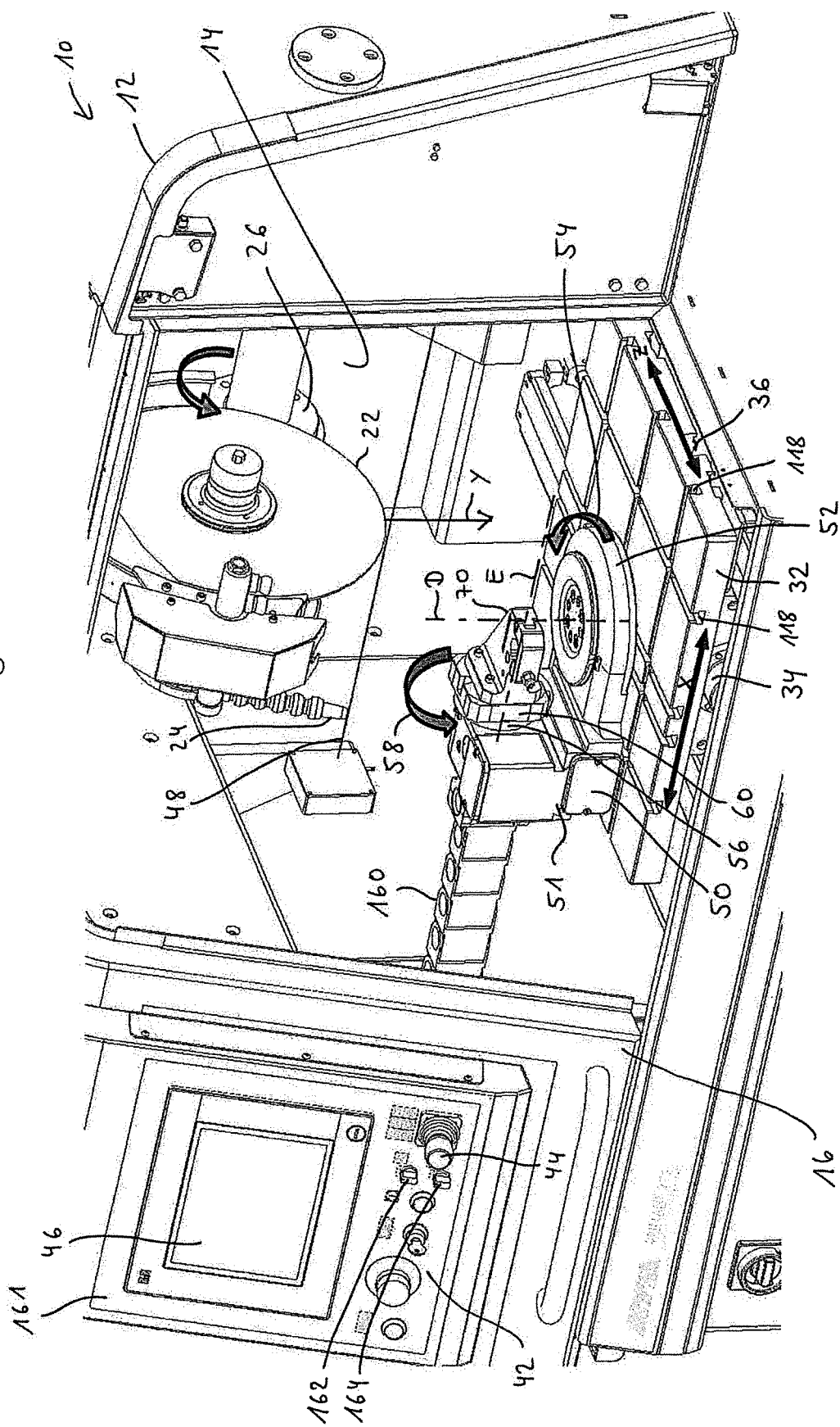
FIG. 2 is a fragmentary perspective view of a cutting machine according to an embodiment of the present disclosure.
Figure 3:
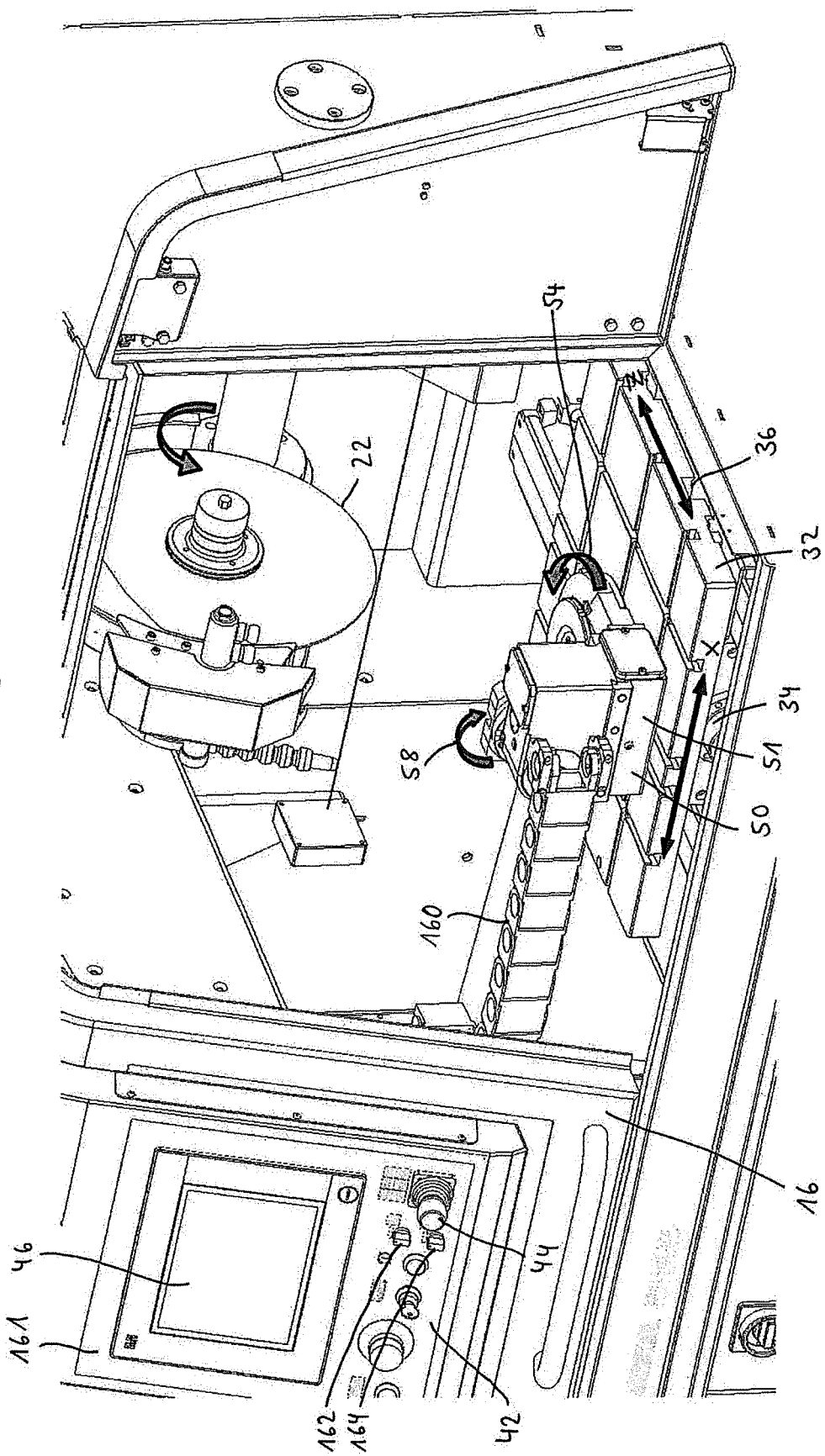
FIG. 3 is a view similar to FIG. 2, with a workpiece positioning device rotated about vertical axis D.
Figure 4:
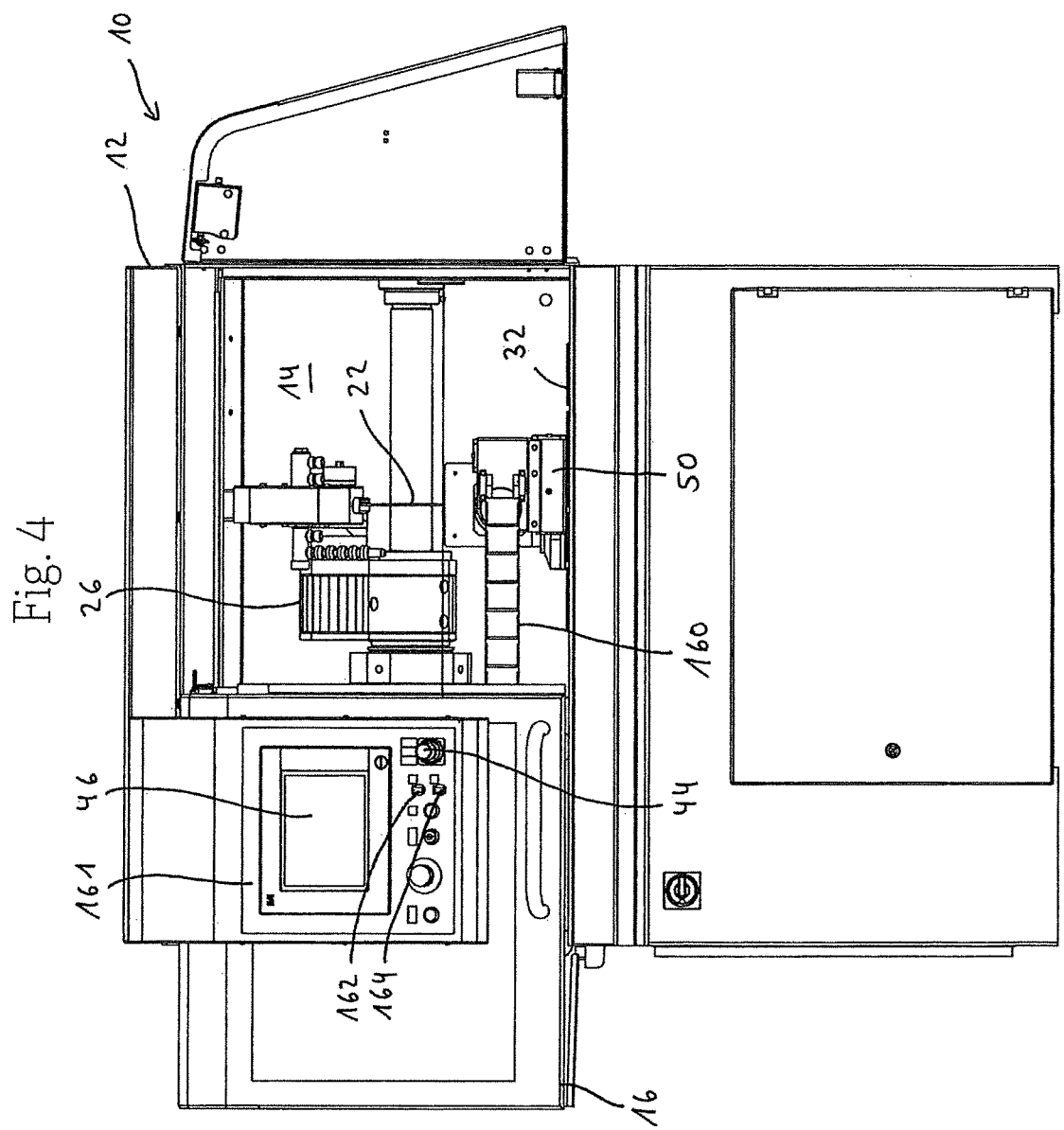
FIG. 4 is a front elevational view of the cutting machine of FIG. 3.

FIG. 1 shows a cutting machine, more specifically Applicant's Brillant 275 wet cut-off machine which can be retrofitted with the present disclosure, as will be seen from FIGS. 2 through 5.

Referring to FIGS. 1 to 5, the cutting machine 10 comprises a machine housing 12 which defines a working space 14 that can be opened and closed by a slideably displaceable covering hood 16 to get access to the working space 14. A cutting wheel 22 is arranged in the working space 14, in the present example a corundum cutting wheel 22, which is driven by a drive motor that is located in the machine housing 12 (not visible in the view). Coolant nozzles 24 provide for adequate cooling of the cutting wheel 22 and the workpiece when performing the separating cuts. Cutting wheel 22 is lowered, in the direction of the y-axis, by a lifting mechanism 26 which in the present example is configured as a pivoting mechanism, in order to be set on the workpiece and to carry out the desired separating cuts.

In working space 14, a work table 32 is arranged, which is mounted for being displaceable in two dimensions in the xz-plane by xz displacement means 34, 36. The driving of the mechanical displacement of the work table 32 in the x-direction and in the z-direction and the setting of the cutting wheel 22 in the y-direction is automatically controlled by a program controller 42, although it is likewise possible to use a joystick 44 for manually setting starting positions for individual separating cuts. The joystick 44 can be used to manually move the work table 32 in the x- and z-directions. Numerical values can be entered via a touchscreen display 46, for example the desired cutting paths or cutting depths.

Prior to each separating cut, it is possible to measure the actual diameter of the cutting wheel 22, automatically or on user request, using a laser measuring device 48, for automatically factoring in, into the previously programmed separating cuts, the progressive wear of the cutting wheel 22 so as to be able to automatically compensate for the wear of the cutting wheel 22 between the individual separating cuts during a separation task that is being performed.

On work table 32, a workpiece positioning device 50 is clamped, which supports a quick-release plate 60 which in turn fixes the clamping means 70 for the workpiece 80 to be processed, by quick-release latching. Workpiece positioning device 50 comprises a first mechanical rotating means 52 which rotates the workpiece positioning device 50 about a vertical first rotation axis D, as symbolized by arrow 54. Furthermore, the workpiece positioning device 50 comprises a second mechanical rotating means 56 which rotates the clamping means 70 about a horizontal second rotation axis E which lies perpendicular to the first rotation axis D, symbolized by arrow 58. The workpiece positioning device 50 comprises electrical supply lines 160 which are routed so as to be flexible about the y-direction perpendicular to the xz-plane.

Thus, the workpiece 80 clamped in clamping means 70 (FIG. 5) can be displaced by means of the work table 32 in the two directions x and z in the xz-plane of the work table, by displacing the work table 32, and can additionally be rotated about the two axes D and E by the workpiece positioning device 50, which provides diverse positioning options for the workpiece 80. Even in the case of complex separation tasks which include a plurality of separating cuts at different angles and in different directions, it is thus possible to automatically perform the respective separating cuts without the need for manual user intervention, in particular without re-clamping the workpiece 80.

Figure 5:
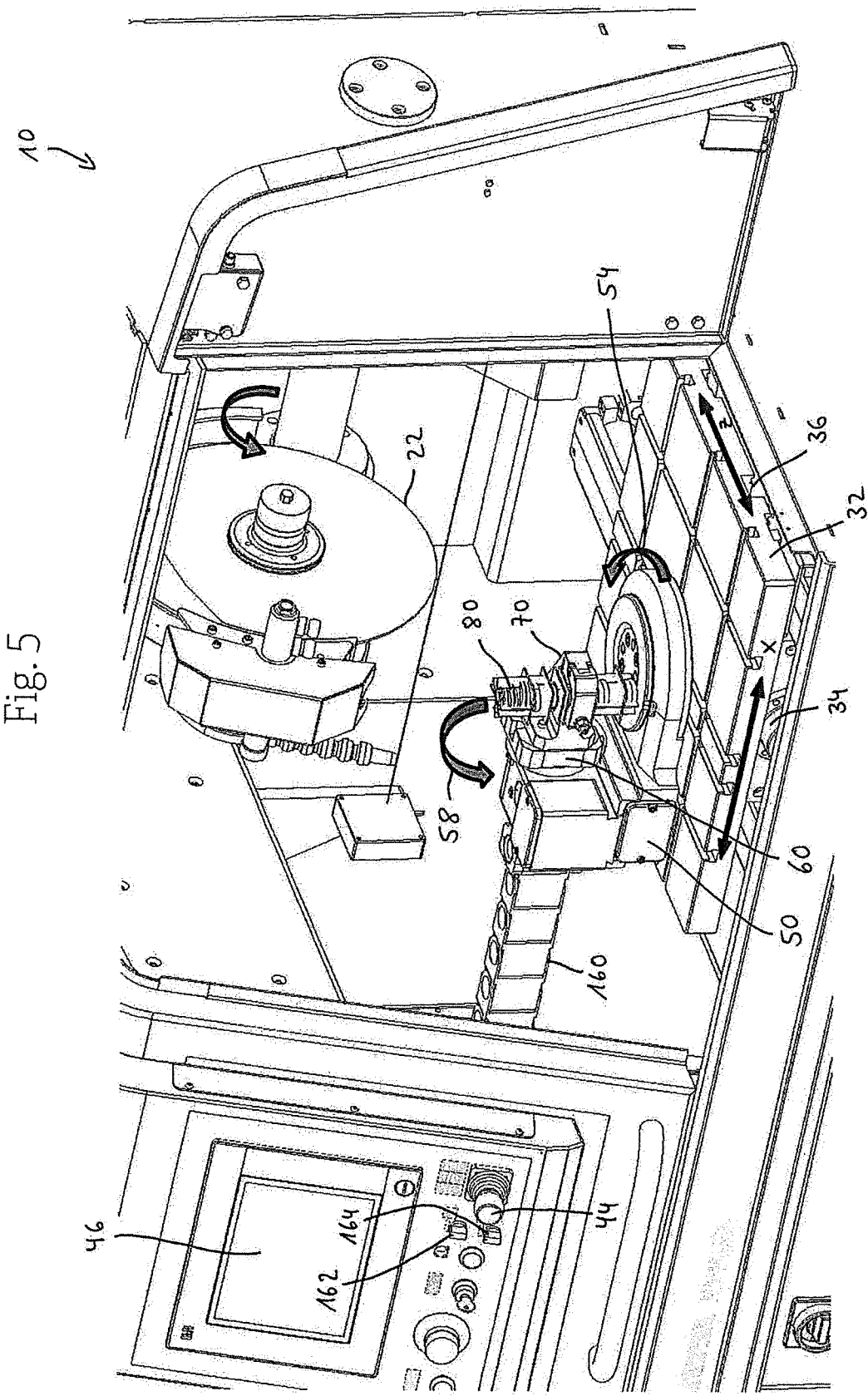
FIG. 5 is a view similar to FIG. 2, with a clamped workpiece.
Figure 6:
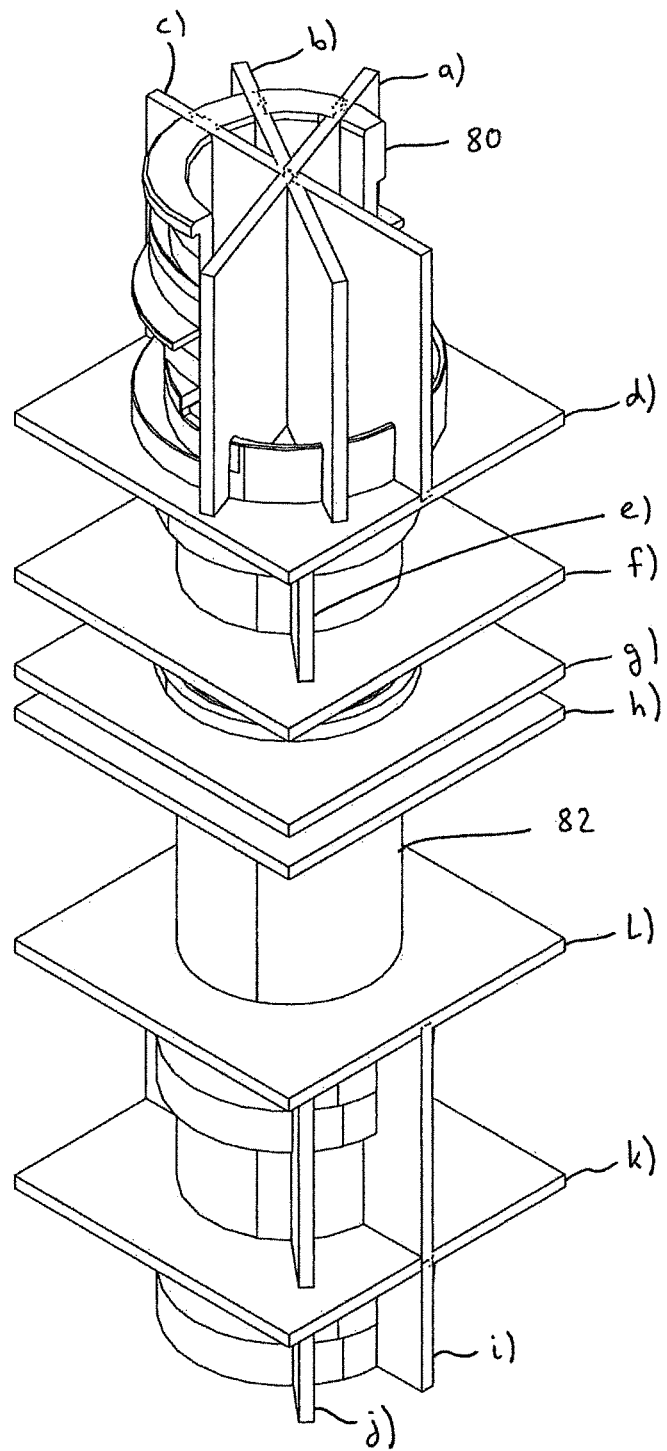
FIG. 6 is a perspective view of a workpiece, with twelve indicated separating cuts to be performed as a complex separation task.
Figure 7:
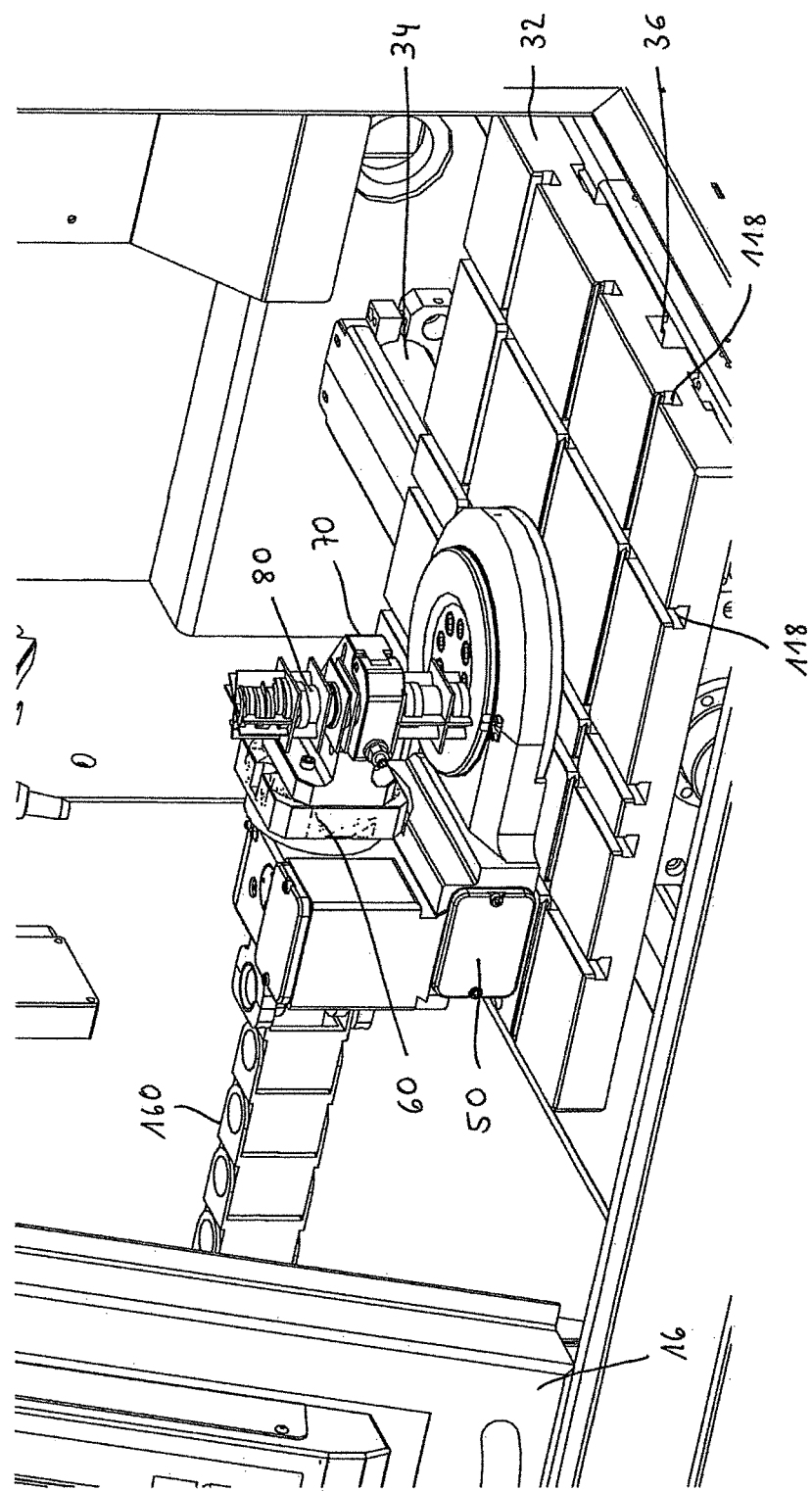
FIG. 7 is a perspective view of the workpiece positioning device mounted on the work table of the cutting machine.

FIG. 6 shows a test specimen as a workpiece in the form of a cam sleeve of an internal combustion engine, on which a total of 12 separating cuts a) through l) are to be performed as a complex separation task, for example in order to carry out examinations of the microstructure at different points of the cam sleeve. The cutting machine 10 according to the present disclosure permits to make all 12 separating cuts a) to l) fully automatically and without re-clamping the workpiece 80. For this purpose, the cam sleeve 80 is clamped in clamping means 70, in the region of portion 82, as shown in FIGS. 5 and 7, for example.

Figure 8:
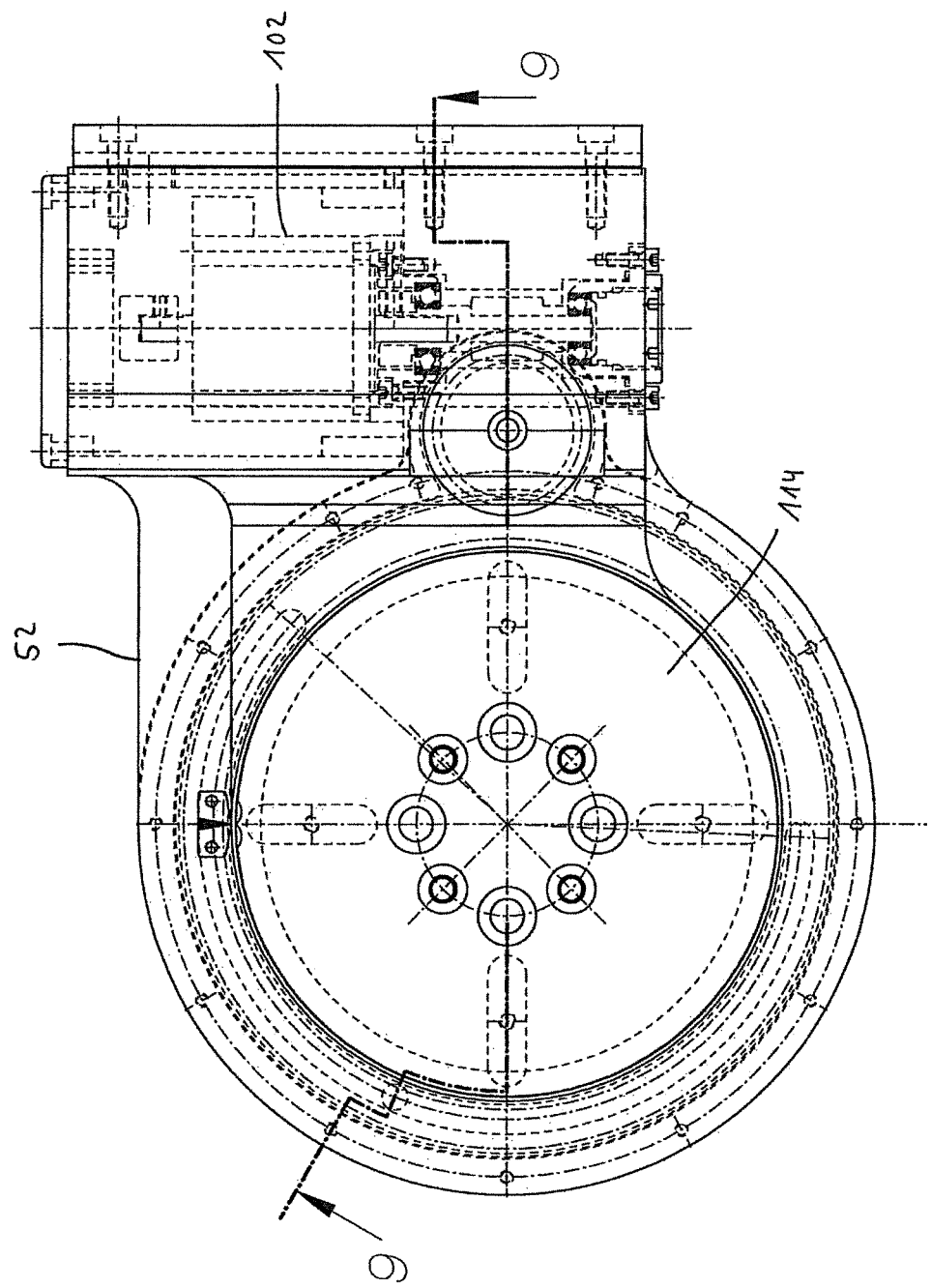
FIG. 8 is a partially transparent plan view of the first mechanical rotating means of the workpiece positioning device.
Figure 9:
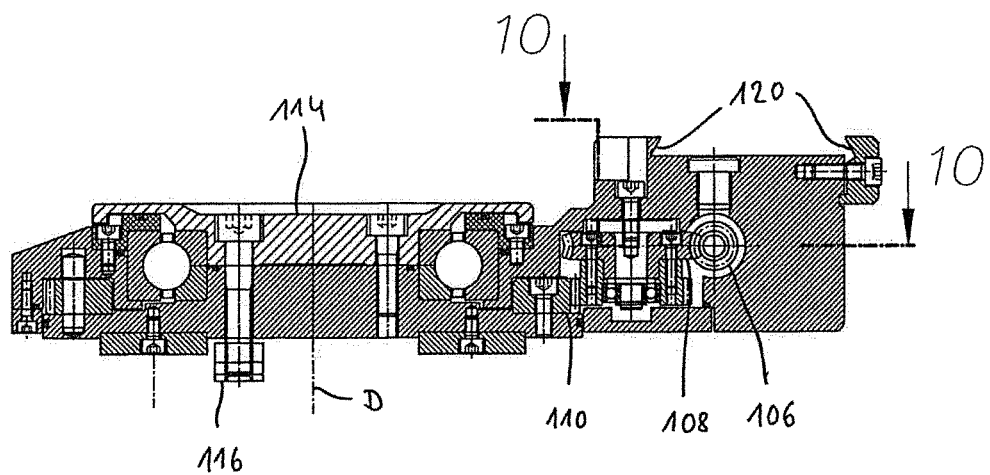
FIG. 9 is a vertical cross-sectional view along line 9-9 of FIG. 8.
Figure 10:
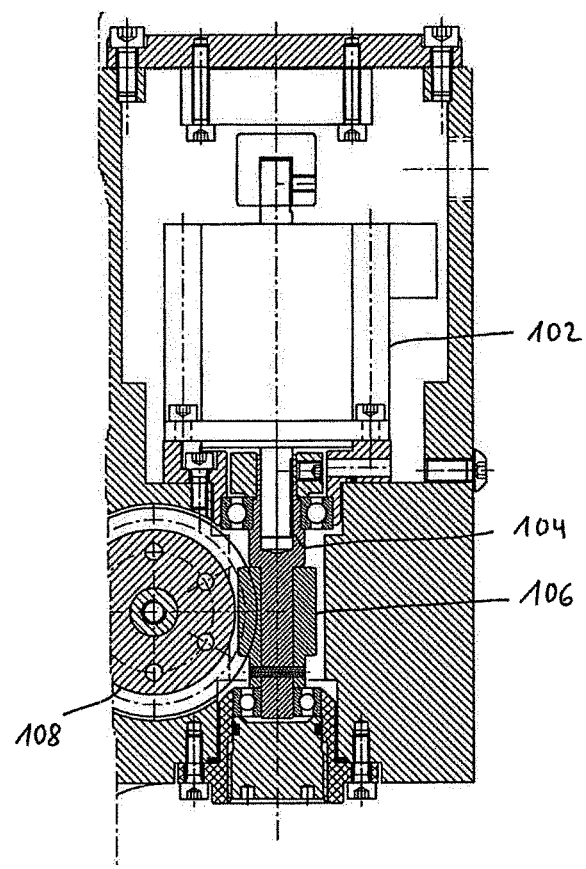
FIG. 10 is a cross-sectional view along line 10-10 of FIG. 9.
Figure 11:
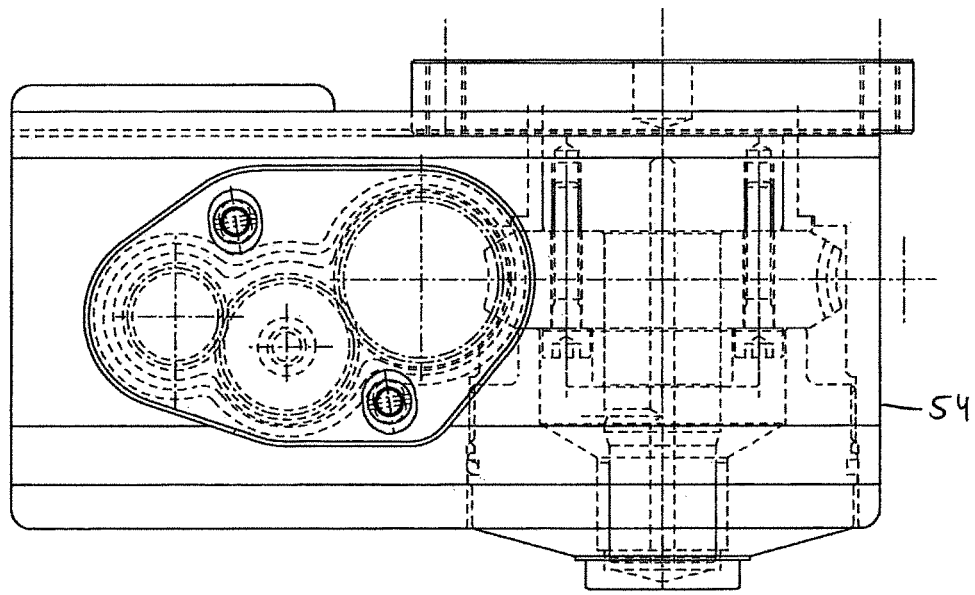
FIG. 11 is a partially transparent bottom view of the second mechanical rotating means of the workpiece positioning device.
Figure 12:
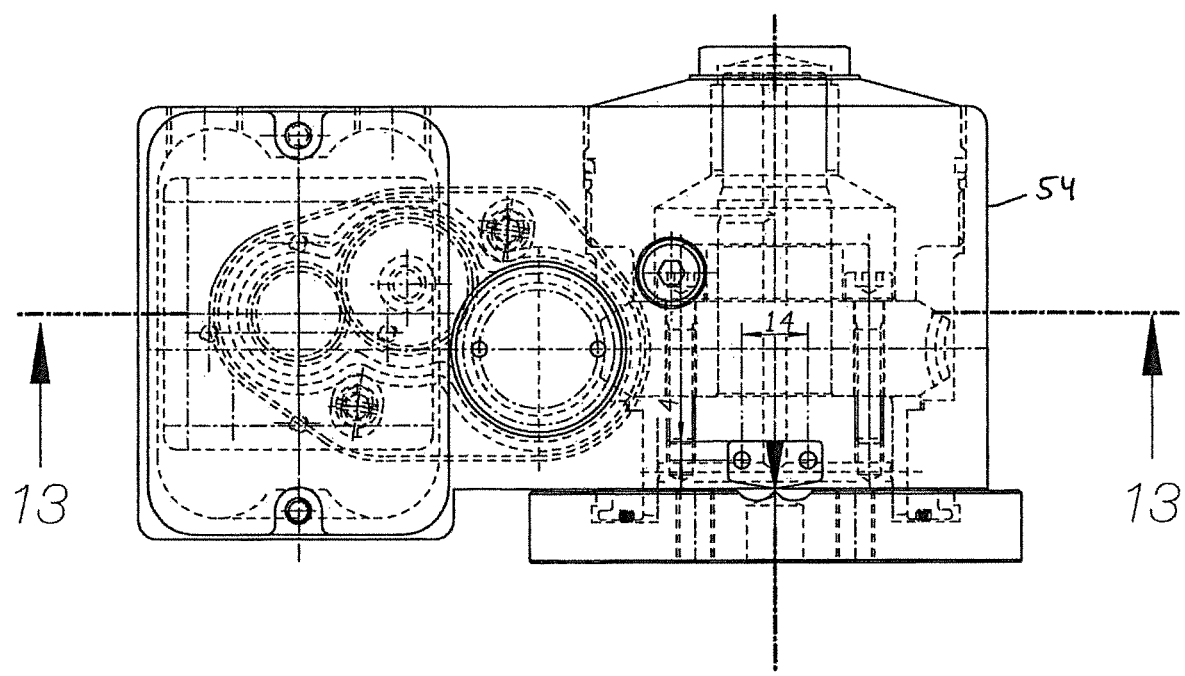
FIG. 12 is a partially transparent top view of the second mechanical rotating means of FIG. 11.
Figure 13:
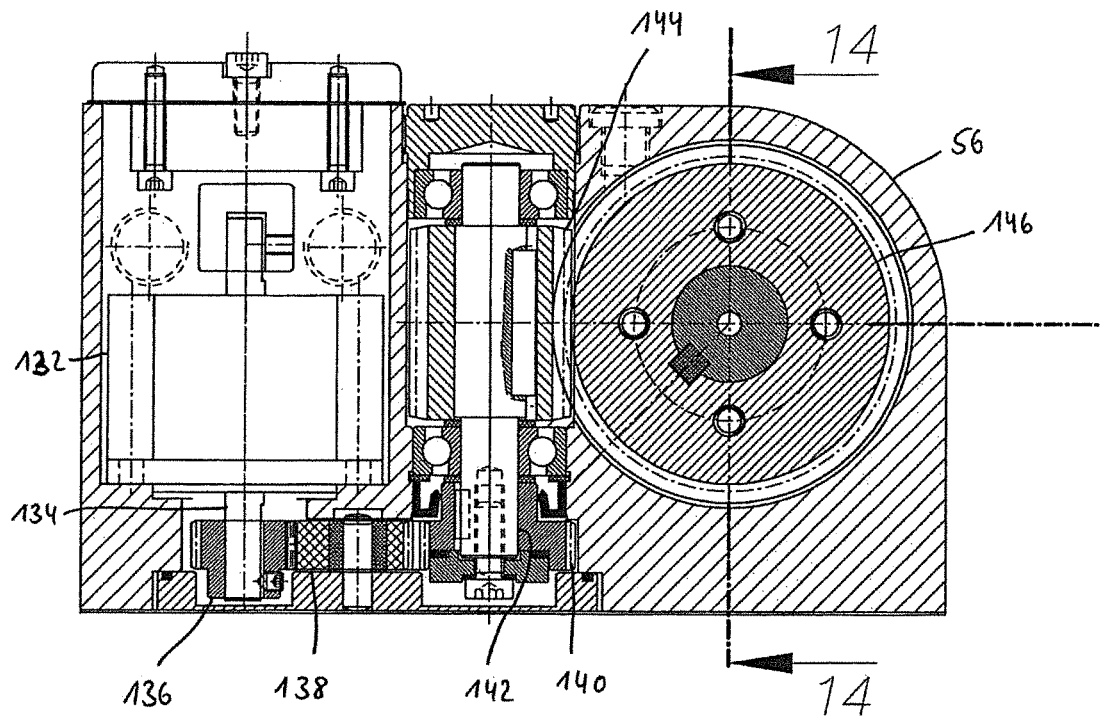
FIG. 13 is a vertical cross-sectional view along line 13-13 of FIG. 12.
Figure 14:
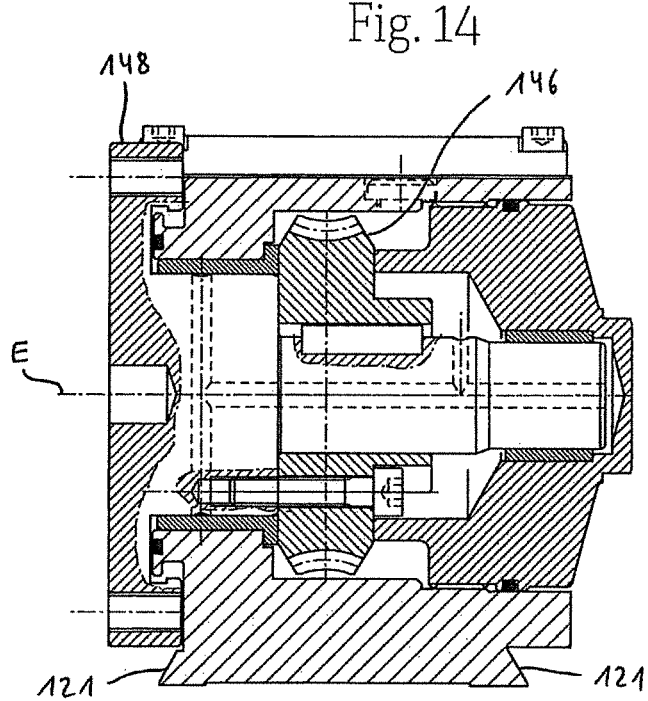
FIG. 14 is a cross-sectional view along line 14-14 of FIG. 13.

Referring to FIGS. 8 to 10, the workpiece positioning device 50 comprises a lower rotating means 52. A 2-phase stepping motor 102 drives a worm 106, via a motor shaft 104, which in turn drives a worm wheel 108. The worm wheel 108 revolves around a ring gear 110. A top plate 114 is firmly clamped in grooves 118 of the work table, by means of clamping elements 116, whereby the workpiece positioning device 50 is rigidly clamped to the work table 32. Due to the engagement between worm wheel 108 and ring gear 110, the entire workpiece positioning device 50 together with its rotary housing 51 rotates relative to the top plate 114 and about rotation axis D, as driven by the stepping motor 102.

The second rotating means 56 (FIGS. 11 to 14) is rigidly connected to the first rotating means 52 by a dovetail guide 120, 121.

Referring to FIGS. 11 to 14, the second rotating means 56 comprises a 2-phase stepping motor 132 which drives a pinion 136, via a motor shaft 134. Pinion 136 drives the worm shaft 142, via an intermediate gear 138 and a pinion 140. The worm 144 mounted on worm shaft 142 drives the worm gear 146 which is connected to the drive plate 148 to turn it about rotation axis E.

Figure 15:
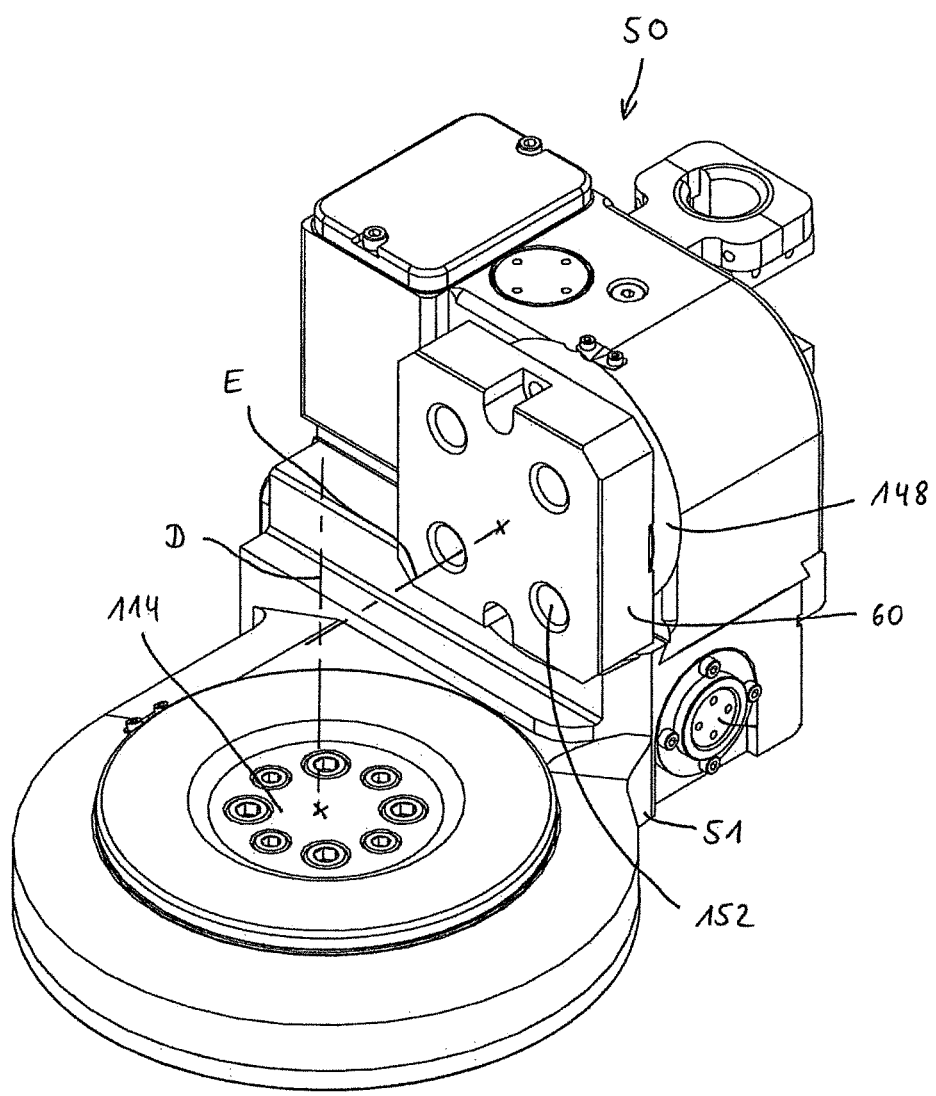
FIG. 15 is a perspective view of the workpiece positioning device.
Figure 16:
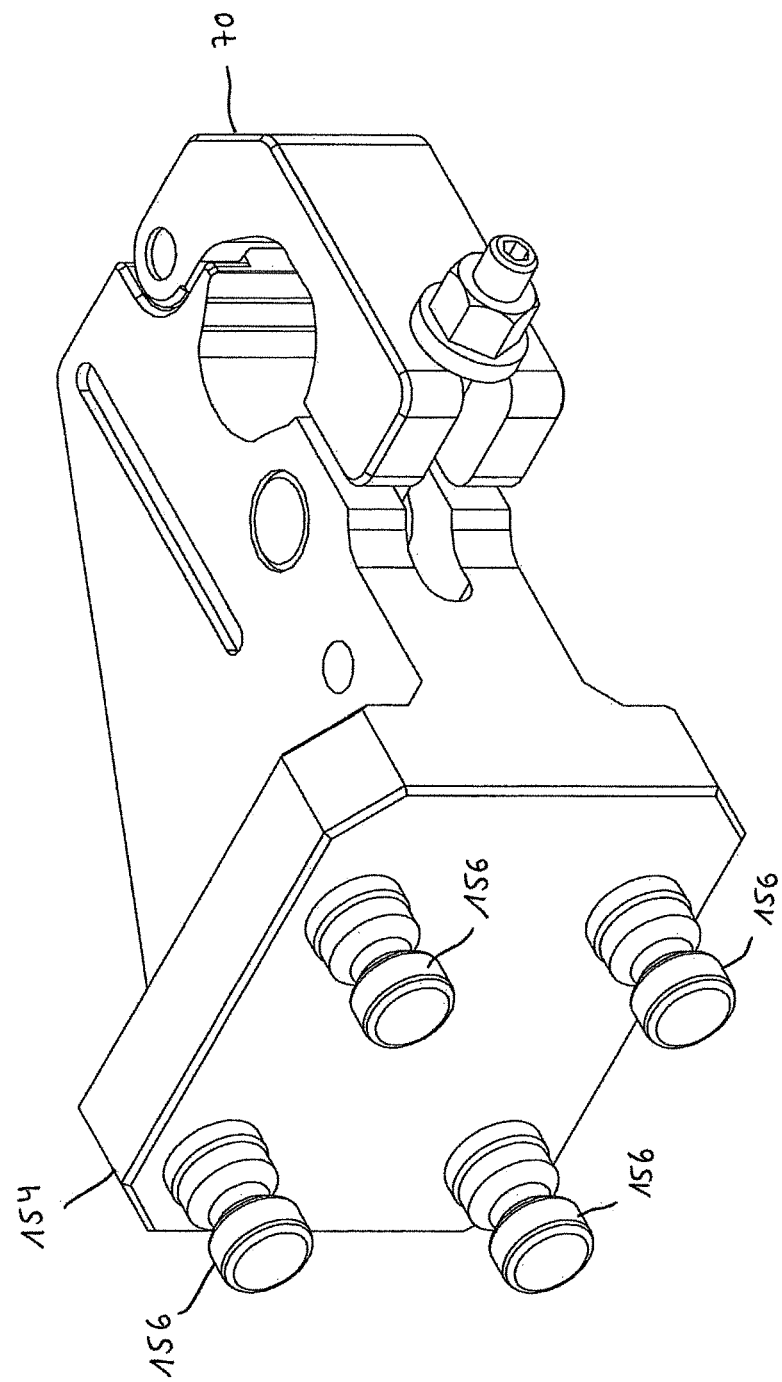
FIG. 16 is a perspective view of a clamping means for a cylindrical workpiece, with connecting spigots for a quick-change device.
Figure 17:
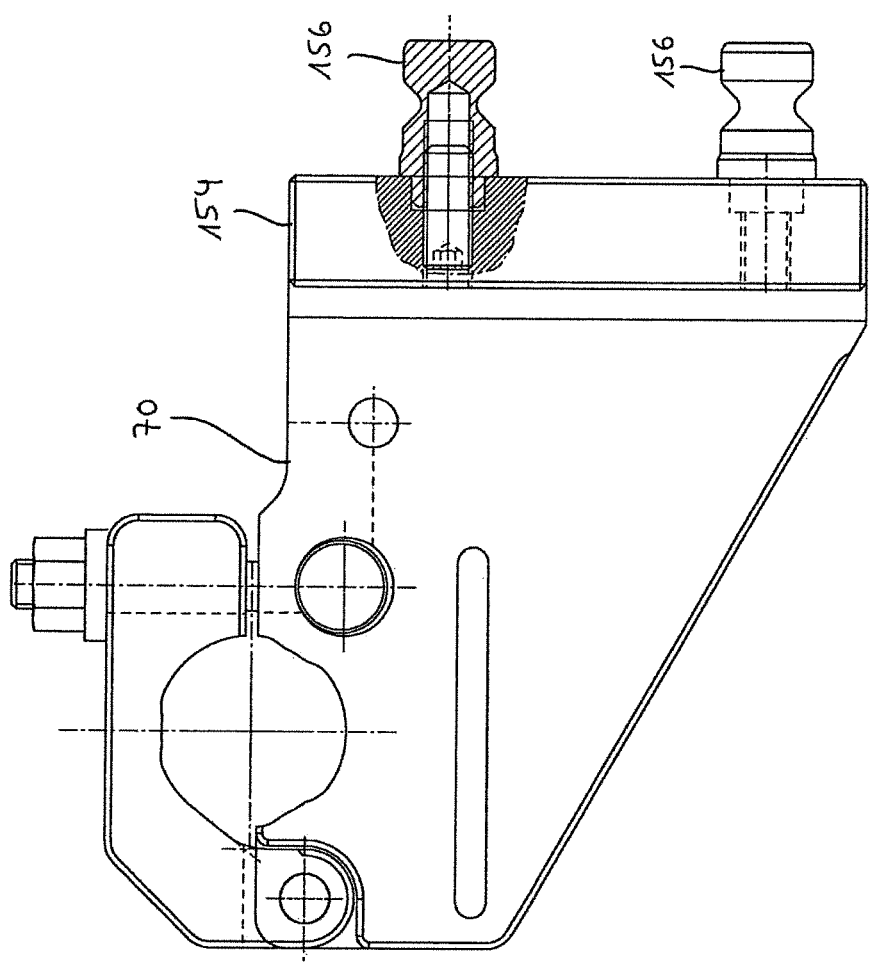
FIG. 17 is a partially sectioned view of the clamping means of FIG. 16.

Referring to FIGS. 15 to 17, drive plate 148 has a quick-change plate 60 attached thereto, which has a quick-latch receptacle 152. Clamping means 70 has a connection plate 154 with quick-release spigots 156 which can be easily latched in and released from the quick-latch receptacle 152. In this way it is possible to easily and rapidly place and replace different workpieces using associated clamping means 70.

The control of the first and second rotating means 52, 56 is integrated in the program controller 42 of cutting machine 10. The control panel 161 of cutting machine 10 comprises a joystick 44 for driving the work table 32 in xz-directions, and in addition thereto two rotary knobs 162, 164 which can be used to manually drive the first and second mechanical rotating means 52, 56. For example, a complex separation task such as that of the cam sleeve 80 in FIG. 6 can be programmed by manually setting each starting position of the individual separating cuts to be made, using the manual control elements 44, 162, 164. The program controller 42 then automatically stores the manually set positions as respective starting positions for each respective separating cut to be performed. The depth of the separating cuts can then be programmed via touch screen display 46. Subsequently, the hood 16 is closed and the entire separation task which comprises to perform the 12 separating cuts a) to l) is performed fully automatically. Program controller 42 thus includes a multi-position process which allows to program a plurality of separation steps in succession and to execute them automatically, while the programming can be done step by step.

The cutting machine according to the present disclosure can thus be referred to as a 5-axes cutting machine 10. Here, the linear axes x and z define the two-dimensional displacement of the work table 32, the y-axis defines the setting direction between the cutting wheel 22 and the workpiece 80, and the additional axes D and E define the two rotation axes about which the workpiece 80 is rotated in addition to the xz translation.

It will be apparent to those skilled in the art that the embodiments described above are only meant to be exemplary, and that the present disclosure is not limited thereto but can rather be varied in many ways without departing from the scope of the claims. Furthermore, all features that have been disclosed in conjunction with the cutting machine are considered to be disclosed in conjunction with the workpiece positioning device as well, and vice versa.

Furthermore, it will be apparent that irrespective of whether disclosed in the description, the claims, the figures, or otherwise, the features also individually define components of the present disclosure, even if they are described together with other features.

The invention claimed is:
1. A wet abrasion cut-off machine using a rotating abrasive cutting wheel for making separating cuts in a test specimen in a closable working space, comprising:
an abrasive cut-off cutting wheel to make a plurality of separating cuts at different angles in a test specimen, and a drive motor for driving the cutting wheel;

coolant nozzles for cooling of the cutting wheel and the test specimen when performing the separating cuts in the closed working space;

a work table for fixing the test specimen to be processed, the work table defining an xz-plane;

a first displacement means for producing a relative displacement between the test specimen and the cutting wheel in the first direction in the xz-plane in order to position the test specimen for separating cuts with the cutting wheel in the first direction in the xz-plane relative to the cutting wheel;

a second displacement means for producing a relative displacement between the test specimen and the cutting wheel in the second direction in the xz-plane perpendicularly to the first direction in order to position the test specimen for separating cuts with the cutting wheel in the first and second directions in the xz-plane relative to the cutting wheel, wherein the work table is displaceable by at least one of the first displacement means or the second displacement means, and wherein i) the work table comprises a two-dimensional xz-translation mechanism, or
  ii) the work table is configured to be displaceable in the first direction and the cutting wheel is configured to be displaceable in the second direction, or
  iii) both i) and ii), in order to accomplish two-dimensional translational relative positioning in the xz-plane between the cutting wheel and the test specimen;

a test specimen positioning device releasably clamped onto the work table and including a clamping means for clamping the test specimen and
  a first mechanical rotating means for rotatably positioning the test specimen clamped in the clamping means about a first rotation axis prior to or between performing separating cuts, wherein the first rotation axis is perpendicular to the xz-plane;

a machine housing accommodating the cutting wheel, the work table, and the test specimen positioning device, wherein the machine housing comprises a covering hood closing the working space while the separating cuts are made and allowing a user to access the test specimen positioning device and the test specimen prior to and after the making of the separating cuts;

a lifting mechanism for setting the cutting wheel on the test specimen in a y-direction perpendicularly to the xz-plane for performing separating cuts in the test specimen using the cutting wheel by introducing the rotating cutting wheel into the test specimen in an advancement direction perpendicular to a rotation axis of the cutting wheel, while the separating cut with the cutting wheel is made through grinding or abrasive removal of the material of the test specimen;

a program controller that controls the first and second displacement means and the first rotating means and that is configured to automatically control the relative displacement in the first and second directions and the rotation of the test specimen about the first rotation axis prior to and between separating cuts, such that a plurality of separating cuts at different positions in the xz-plane and with different rotational positions of the test specimen are successively controlled automatically when the hood is closed, allowing to execute separation tasks in the form of separating a plurality of sample portions from the test specimen with the separating cuts at the different angles with different cuts effected automatically; and a diameter measuring device for the cutting wheel, adapted to measure the diameter of the cutting wheel automatically or on user request between the separating cuts, and wherein the setting and separating paths for the separating cuts still to be performed after the measurement are automatically adjusted by the program controller on the basis of the measured diameter values.

2. The wet abrasion cut-off machine as claimed in claim 1, wherein the first mechanical rotating means includes a fixing plate clamped in grooves of the work table by means of clamping elements.

3. The wet abrasion cut-off machine as claimed in claim 1, wherein the test specimen positioning device comprises flexibly routed supply lines which are routed so as to be flexible about the y-direction perpendicular to the xz-plane.

4. The wet abrasion cut-off machine as claimed in claim 3, wherein the machine housing also accommodates the flexibly routed supply lines.

5. The wet abrasion cut-off machine as claimed in claim 1, further comprising one or more manual control elements for manually driving at least one of the first displacement means or the second displacement means and at least one of the first mechanical rotating means or a second mechanical rotating means so as to be able to manually set desired separating cuts.

6. The wet abrasion cut-off machine as claimed in claim 5, wherein, for programming the desired separating cuts, the starting position in at least one of the first direction or the second direction in the xz-plane and with respect to at least one of the first rotational position of the test specimen or the second rotational position of the test specimen for the respective separating cut is set manually using the one or more manual control elements, and is stored, and the associated separating path and optionally further separation parameters are programmed into the program controller as numerical values.

7. The wet abrasion cut-off machine of claim 1, wherein the diameter measuring device for the cutting wheel comprises a laser measuring device.

8. A wet abrasion cut-off machine using a rotating abrasive cutting wheel for making separating cuts in a test specimen in a closable working space, comprising:

an abrasive cut-off cutting wheel to make a plurality of separating cuts at different angles in a test specimen, and a drive motor for driving the cutting wheel;

coolant nozzles for cooling of the cutting wheel and the test specimen when performing the separating cuts in the closed working space;

a work table for fixing the test specimen to be processed, the work table defining an xz-plane;

a first displacement means for producing a relative displacement between the test specimen and the cutting wheel in the first direction in the xz-plane in order to position the test specimen for separating cuts with the cutting wheel in the first direction in the xz-plane relative to the cutting wheel;

a second displacement means for producing a relative displacement between the test specimen and the cutting wheel in the second direction in the xz-plane perpendicularly to the first direction in order to position the test specimen for separating cuts with the cutting wheel in the first and second directions in the xz-plane relative to the cutting wheel, wherein the work table is displaceable by at least one of the first displacement means or the second displacement means, and wherein
  i) the work table comprises a two-dimensional xz-translation mechanism, or
  ii) the work table is configured to be displaceable in the first direction and the cutting wheel is configured to be displaceable in the second direction, or
  iii) both i) and ii),
in order to accomplish two-dimensional translational relative positioning in the xz-plane between the cutting wheel and the test specimen;
a test specimen positioning device releasably clamped onto the work table and including
  a clamping means for clamping the test specimen and
  a first mechanical rotating means for rotatably positioning the test specimen clamped in the clamping means about a first rotation axis prior to or between performing separating cuts, wherein the first rotation axis is perpendicular to the xz-plane;
a machine housing accommodating the cutting wheel, the work table, and the test specimen positioning device, wherein the machine housing comprises a covering hood closing the working space while the separating cuts are made and allowing a user to access the test specimen positioning device and the test specimen prior to and after the making of the separating cuts;
a lifting mechanism for setting the cutting wheel on the test specimen in a y-direction perpendicularly to the xz-plane for performing separating cuts in the test specimen using the cutting wheel by introducing the rotating cutting wheel into the test specimen in an advancement direction perpendicular to a rotation axis of the cutting wheel, while the separating cut with the cutting wheel is made through grinding or abrasive removal of the material of the test specimen;
a program controller that controls the first and second displacement means and the first rotating means and that is configured to automatically control the relative displacement in the first and second directions and the rotation of the test specimen about the first rotation axis prior to and between separating cuts, such that a plurality of separating cuts at different positions in the xz-plane and with different rotational positions of the test specimen are successively controlled automatically when the hood is closed, allowing to execute separation tasks in the form of separating a plurality of sample portions from the test specimen with the separating cuts at the different angles with different cuts effected automatically and;
wherein the first mechanical rotating means includes a plate releasably clamped onto the work table, and a rotary housing rotatable with respect to the plate, and wherein the test specimen positioning device comprises a second mechanical rotating means for rotatably positioning the test specimen clamped in the clamping means about a second rotation axis prior to or between performing separating cuts, wherein the second rotation axis is parallel to the xz-plane and wherein the second mechanical rotating means is rigidly connected to the rotary housing of the first mechanical rotating means via a dovetail guide.

9. The wet abrasion cut-off machine as claimed in claim 8, wherein the first rotation axis is perpendicular to the xz-plane, or the second rotation axis is parallel to the xz-plane, or the first rotation axis is perpendicular to the xz-plane and the second rotation axis is parallel to the xz-plane.

10. The wet abrasion cut-off machine as claimed in claim 8, wherein the first mechanical rotating means, or the second mechanical rotating means, or both the first and the second mechanical rotating means allow the test specimen to be rotated by at least 90° about the first and second rotation axes, respectively.

11. The wet abrasion cut-off machine as claimed in claim 8, wherein the test specimen positioning device comprises a stepping motor and a worm gear driven by the stepping motor, for rotatably positioning the test specimen clamped in the clamping device about the first rotation axis, the second rotation axis, or both the first and second rotation axes.

12. The wet abrasion cut-off machine as claimed in claim 11, wherein the test specimen positioning device comprises a fixing plate and a rotary housing, wherein the fixing plate is releasably clampable to the work table and the rotary housing is mounted for rotation about the fixing plate such that for rotatably positioning the test specimen about the first rotation axis, the rotary housing is rotated about the fixing plate, in particular together with the first stepping motor, or a second stepping motor, or both the first stepping motor and the second stepping motor.

13. The wet abrasion cut-off machine as claimed in claim 8, wherein the second mechanical rotating means comprises a drive plate and a quick-change plate attached to the drive plate and having a quick-latch receptacle to receive quick-release spigots of a connection plate of the clamping means, such that the second mechanical rotating means is adapted for fixing different clamping means to the test specimen positioning device.

14. A wet abrasion cut-off machine using a rotating abrasive cut-off wheel for making separating cuts in a test specimen in a closable working space, and comprising:
  an abrasive cut-off cutting wheel to make a plurality of separating cuts at different angles in a test specimen in the closable working space and a drive motor for driving the cutting wheel;
  coolant nozzles for cooling of the cutting wheel and the test specimen when performing the separating cuts in the closed working space;
  a clamping means for clamping the test specimen;
  a first means for mechanically positioning the test specimen along a first translational direction in an xz-plane and additionally mechanically positioning the test specimen about a first rotation axis, when the test specimen is clamped in the clamping means on top of a work table, wherein the first rotation axis is a vertical axis;
  a second means for mechanically positioning the test specimen or the cutting wheel along a second translational direction in the xz-plane perpendicularly to the first translational direction, when the test specimen is clamped in the clamping means on top of the work table, for producing a relative displacement between the test specimen and the cutting wheel in the second translational direction;
  wherein i) the test specimen is translated along the first and second translational directions or ii) the test specimen is translated along the first translational direction and the cutting wheel is translated along the second translational direction;
  a machine housing accommodating the cutting wheel, the work table, and the first and second means for mechanically positioning along the first and second translational directions, wherein the machine housing comprises a covering hood closing the working space while the separating cuts are made and allowing a user to access the test specimen positioning device and the test specimen prior to and after making the separating cuts;
a lifting mechanism for setting the cutting wheel on the test specimen to perform separating cuts in the positioned test specimen using the cutting wheel, by introducing the rotating cutting wheel into the test specimen in an advancement direction perpendicular to a rotation axis of the cutting wheel, while the separating cut with the cutting wheel is made through grinding or abrasive removal of the material of the test specimen;
a program controller that controls the first and second means and that is configured to automatically control the relative displacement in the first and second translational directions and the rotation of the test specimen about the first rotation axis prior to and between separating cuts, such that a plurality of separating cuts at different positions in the xz-plane and with different rotational positions of the test specimen are successively controlled automatically when the hood is closed, allowing to execute separation tasks in the form of separating a plurality of sample portions from the test specimen with separating cuts at different angles with different cuts effected automatically; and
a diameter measuring device for the cutting wheel, adapted to measure the diameter of the cutting wheel automatically or on user request between the separating cuts, and wherein the setting and separating paths for the separating cuts still to be performed after the measurement are automatically adjusted by the program controller on the basis of the measured diameter values.

15. The wet abrasion cut-off machine of claim 14, wherein the lifting mechanism is lowered by pivoting movement about a pivot axis offset from the rotation axis of the cutting wheel.

16. The wet abrasion cut-off machine of claim 14, wherein the cutting wheel is not rotatable about an axis perpendicular to the rotation axis of the cutting wheel.

17. The wet abrasion cut-off machine of claim 14, wherein the wet abrasion cut-off machine is at least a 4-axes cut-off machine.

18. The wet abrasion cut-off machine of claim 14, wherein the separating cuts of the test specimen are automatically performed without manual user intervention.

19. The wet abrasion cut-off machine of claim 14, wherein the lifting mechanism sets the cutting wheel on the test specimen in a direction transverse to the xz-plane.

20. The wet abrasion cut-off machine of claim 19, wherein the lifting mechanism sets the cutting wheel on the test specimen in a y-direction perpendicularly to the xz-plane.

21. The wet abrasion cut-off machine of claim 14, wherein the first means is configured to rotate the test specimen by at least 90° about the first rotation axis.

22. The wet abrasion cut-off machine of claim 14, wherein the first means is configured to rotate the test specimen by at least 180° about the first rotation axis.

23. The wet abrasion cut-off machine of claim 14, further comprising a third means for mechanically positioning the test specimen about a second rotation axis.

24. The wet abrasion cut-off machine of claim 23, wherein the second rotation axis is perpendicular to the first rotation axis.

25. The wet abrasion cut-off machine of claim 23, wherein the second rotation axis is parallel to the xz-plane.

26. The wet abrasion cut-off machine of claim 23, wherein the third means is configured to rotate the test specimen by at least 90° about the second rotation axis.

27. The wet abrasion cut-off machine of claim 23, wherein the third means is configured to rotate the test specimen by at least 180° about the second rotation axis.

28. The wet abrasion cut-off machine of claim 14, wherein the diameter measuring device for the cutting wheel is a laser measuring device.

* * * * *

UNITED STATES PATENT AND TRADEMARK OFFICE
CERTIFICATE OF CORRECTION

| | | |
|---|---|---|
| PATENT NO. | : 11,660,719 B2 | Page 1 of 1 |
| APPLICATION NO. | : 16/076446 | |
| DATED | : May 30, 2023 | |
| INVENTOR(S) | : Heinrich Müller | |

It is certified that error appears in the above-identified patent and that said Letters Patent is hereby corrected as shown below:

On the Title Page

Item (73) Assignee: delete "ATM GmbH" and insert --ATM Qness GmbH--

Signed and Sealed this
Fourteenth Day of November, 2023

Katherine Kelly Vidal
*Director of the United States Patent and Trademark Office*